(12) United States Patent
Downs et al.

(10) Patent No.: US 10,143,218 B1
(45) Date of Patent: Dec. 4, 2018

(54) ANIMAL FEED SUPPLEMENT

(71) Applicant: AC Nutrition, LP, Winters, TX (US)

(72) Inventors: Dale Downs, Louisville, NE (US);
Mark Urbanosky, Ardmore, OK (US);
Lowell R. Smalley, Omaha, NE (US)

(73) Assignee: AC NUTRITION, LP, Winters, TX (US)

( * ) Notice: Subject to any disclaimer, the term of this patent is extended or adjusted under 35 U.S.C. 154(b) by 118 days.

(21) Appl. No.: 14/206,282

(22) Filed: Mar. 12, 2014

Related U.S. Application Data

(60) Provisional application No. 61/789,094, filed on Mar. 15, 2013.

(51) Int. Cl.
| | | |
|---|---|---|
| *A23K 1/00* | (2006.01) | |
| *A23K 1/165* | (2006.01) | |
| *A23K 1/18* | (2006.01) | |
| *A23K 10/18* | (2016.01) | |
| *A23K 50/20* | (2016.01) | |
| *A23K 20/189* | (2016.01) | |

(52) U.S. Cl.
CPC ............ *A23K 1/009* (2013.01); *A23K 1/1653* (2013.01); *A23K 1/1806* (2013.01); *A23K 10/18* (2016.05); *A23K 20/189* (2016.05); *A23K 50/20* (2016.05)

(58) Field of Classification Search
CPC ..... A23K 1/009; A23K 1/1806; A23K 1/1653
See application file for complete search history.

(56) References Cited

U.S. PATENT DOCUMENTS

| | | | |
|---|---|---|---|
| 1,206,226 A | 11/1916 | Julien | |
| 3,617,306 A * | 11/1971 | Pomper et al. | ........ C12N 1/005 99/96 |
| 4,118,512 A * | 10/1978 | Eichelburg | ................ A23J 3/32 426/2 |
| 4,925,637 A | 5/1990 | Julien et al. | |
| 5,077,068 A | 12/1991 | Julien et al. | |
| 5,709,894 A | 1/1998 | Julien | |
| 5,720,970 A | 2/1998 | Rode et al. | |
| 5,783,238 A | 7/1998 | Julien | |
| 5,863,574 A | 1/1999 | Julien | |
| 5,871,773 A | 2/1999 | Rode et al. | |
| 6,312,710 B1 | 11/2001 | Julien | |
| 6,337,084 B1 * | 1/2002 | Stevens | ................. A23K 1/002 424/438 |
| 6,410,305 B1 * | 6/2002 | Miller | ...................... A01K 1/01 210/611 |
| 6,514,521 B1 | 2/2003 | Julien | |

(Continued)

FOREIGN PATENT DOCUMENTS

| | | | |
|---|---|---|---|
| EP | 610957 A2 | 8/1994 | |
| EP | 610957 A3 | 8/1995 | |

(Continued)

OTHER PUBLICATIONS

Jouany et al. "Effect of live yeast culture supplementation on hindgut . . . " 2009 J. Anim. Sci. vol. 87 No. 9 pp. 2844-2852.*

*Primary Examiner* — Felicia C Turner
(74) *Attorney, Agent, or Firm* — Ryan T. Grace; Advent, LLP

(57) ABSTRACT

The animal feed supplement enhances digestibility and allows animals to be more efficient with rations. The supplement can include enzymes that decrease the amount of starch and fiber passing out of the small intestine and cecum.

11 Claims, 11 Drawing Sheets

(56) References Cited

U.S. PATENT DOCUMENTS

| | | |
|---|---|---|
| 6,858,239 B2 | 2/2005 | Julien |
| 8,178,088 B2 | 5/2012 | Julien |
| 2002/0176904 A1 | 11/2002 | Julien |
| 2003/0077254 A1* | 4/2003 | Ramaekers ............ A61K 31/19 424/93.3 |
| 2003/0108653 A1 | 6/2003 | Julien |
| 2004/0121002 A1* | 6/2004 | Lee ..................... A21D 8/042 424/461 |
| 2005/0053693 A1 | 3/2005 | Julien et al. |
| 2006/0127531 A1* | 6/2006 | Jobe ..................... A23K 1/003 426/2 |
| 2006/0188549 A1* | 8/2006 | Block ..................... A23K 1/009 424/442 |
| 2006/0193834 A1 | 8/2006 | Julien |
| 2007/0092589 A1* | 4/2007 | Robinson ............ A61K 36/185 424/757 |
| 2009/0114602 A1* | 5/2009 | Logan ..................... A23J 1/001 210/744 |
| 2009/0246320 A1* | 10/2009 | Forte ..................... A23K 40/20 426/61 |
| 2012/0034198 A1 | 2/2012 | Garner et al. |
| 2012/0121565 A1 | 5/2012 | Williams |
| 2013/0022576 A1 | 1/2013 | Altman |
| 2013/0089530 A1* | 4/2013 | Rodriguez ............ A61K 36/064 424/93.41 |

FOREIGN PATENT DOCUMENTS

| | | |
|---|---|---|
| EP | 728418 A1 | 8/1996 |
| EP | 728418 A4 | 5/1997 |
| EP | 917472 A1 | 5/1999 |
| EP | 610957 B1 | 11/2002 |
| EP | 831717 B1 | 12/2002 |
| EP | 917472 B1 | 3/2003 |
| WO | 1996/039860 A1 | 12/1996 |
| WO | 1998/004283 A1 | 2/1998 |
| WO | 2003/049551 A1 | 6/2003 |
| WO | 2004/098272 A2 | 11/2004 |
| WO | 2004/098272 A3 | 7/2005 |
| WO | 2013/021161 A2 | 2/2013 |

\* cited by examiner

| Analyte | Alfalfa cubes | Alfalfa meal | Yb Supp | Textured Supp | Placebo Supp | TRT1 Supp | TRT2 Supp | CON Ration | TRT1 Ration | TRT2 Ration |
|---|---|---|---|---|---|---|---|---|---|---|
| DM, % | 88.7 | 90.3 | 94.7 | 88.3 | 89.4 | 91.9 | 92.1 | 89.0 | 89.1 | 89.1 |
| ADF, % of DM | 39.6 | 38.8 | 22.0 | 11.2 | 20.1 | 8.62 | 8.23 | 36.7 | 36.6 | 36.6 |
| NDF, % of DM | 49.2 | 46.7 | 28.7 | 25.7 | 23.0 | 17.7 | 16.4 | 46.0 | 45.9 | 45.9 |
| CP, % of DM | 14.0 | 18.4 | 10.2 | 12.0 | 29.3 | 19.2 | 25.4 | 14.4 | 14.0 | 14.1 |
| Oil, % of DM | 2.33 | 2.20 | 1.72 | 7.06 | 4.45 | 6.83 | 7.57 | 2.66 | 2.66 | 2.67 |
| Starch, % of DM | 1.23 | 0.84 | 2.54 | 38.25 | 4.14 | 26.77 | 25.8 | 2.94 | 3.13 | 3.10 |
| Ca, % of DM | 1.62 | 1.28 | 1.00 | 1.20 | 1.73 | 0.72 | 0.58 | 1.73 | 1.71 | 1.71 |
| P, % of DM | 0.23 | 0.24 | 0.11 | 0.62 | 0.53 | 0.76 | 0.73 | 0.26 | 0.26 | 0.26 |
| Mg, % of DM | 0.29 | 0.22 | 0.38 | 0.26 | 0.25 | 0.36 | 0.37 | 0.30 | 0.30 | 0.30 |
| K, % of DM | 2.11 | 1.90 | 3.89 | 1.03 | 1.99 | 1.08 | 1.09 | 2.14 | 2.10 | 2.10 |
| Na, % of DM | 0.05 | 0.02 | 0.06 | 0.25 | 0.07 | 0.55 | 0.68 | 0.07 | 0.08 | 0.08 |
| Cl, % of DM | 0.27 | 0.72 | 2.06 | 0.56 | 0.04 | 0.59 | 1.05 | 0.23 | 0.23 | 0.24 |
| S, % of DM | 0.25 | 0.17 | 0.65 | 0.21 | 0.39 | 2.25 | 2.25 | 0.27 | 0.30 | 0.30 |

FIG. 1

|  | CON | SE | TRT1 | SE | TRT2 | SE | P |
|---|---|---|---|---|---|---|---|
| *Weight, lbs* | | | | | | | |
| Beginning | 1177[a] | 67.4 | 1167[a] | 43.8 | 1031[b] | 17.6 | 0.02 |
| Final | 1216[a] | 66.2 | 1227[a] | 50.9 | 1078[b] | 15.8 | 0.03 |
| Post-trial | 1222[a] | 66.0 | 1241[a] | 45.3 | 1088[b] | 14.3 | 0.02 |
| *Average daily gains, lbs* | | | | | | | |
| Main trial | 1.40[b] | 0.16 | 2.12[a] | 0.32 | 1.68[ab] | 0.35 | 0.18 |
| Post-trial | 0.43 | 0.49 | 1.00 | 0.45 | 0.71 | 0.67 | 0.70 |
| Total trial (Main plus post) | 1.08[b] | 0.20 | 1.74[a] | 0.07 | 1.36[ab] | 0.44 | 0.03 |
| *Dry matter intake, lb/day* | | | | | | | |
| Acclimation | 20.4 | 1.11 | 20.9 | 0.97 | 20.3 | 0.18 | 0.84 |
| Main trial | 22.8 | 2.71 | 23.3 | 1.93 | 22.5 | 1.23 | 0.94 |
| Post-trial | 23.1 | 2.12 | 23.8 | 2.30 | 22.4 | 1.33 | 0.86 |
| Total trial (Main plus post) | 22.9 | 2.59 | 23.4 | 1.99 | 22.5 | 1.25 | 0.93 |
| *FE, DMI/ADG* | | | | | | | |
| Main trial | 16.7[a] | 2.26 | 11.4[b] | 1.00 | 14.8[ab] | 2.41 | 0.12 |
| Total trial (Main plus post) | 22.7 | 2.95 | 13.4[b] | 0.96 | 23.6[ab] | 8.66 | 0.03 |

[a,b] Means within rows with unlike superscripts differ (P<0.07).

FIG. 2

|  | CON | SE | TRT1 | SE | TRT2 | SE | P |
|---|---|---|---|---|---|---|---|
| *Acclimation* | | | | | | | |
| DM | 53.6 | 4.55 | 54.9 | 2.97 | 54.8 | 1.93 | 0.97 |
| ADF | 39.9 | 5.66 | 42.9 | 3.73 | 42.4 | 2.45 | 0.91 |
| NDF | 40.2 | 5.90 | 42.8 | 3.52 | 42.3 | 2.86 | 0.93 |
| CP | 68.7 | 3.86 | 67.5 | 2.75 | 69.2 | 1.67 | 0.87 |
| Oil | 22.6 | 7.99 | 27.0 | 4.81 | 23.6 | 1.88 | 0.79 |
| Starch | 88.1 | 1.51 | 88.7 | 2.13 | 91.3 | 0.77 | 0.16 |
| *Main Trial* | | | | | | | |
| DM | 61.3 | 0.48 | 64.4 | 1.89 | 63.3 | 1.99 | 0.26 |
| ADF | 42.0 | 0.80 | 47.5 | 3.11 | 45.6 | 2.82 | 0.19 |
| NDF | 42.0 | 0.91 | 47.3 | 3.18 | 45.5 | 2.98 | 0.23 |
| CP | 72.7 | 1.03 | 74.1 | 1.39 | 73.1 | 1.63 | 0.71 |
| Oil | 38.7 | 1.76 | 43.9 | 2.98 | 44.6 | 3.92 | 0.24 |
| Starch | 87.2 | 1.28 | 91.0 | 1.81 | 88.7 | 1.85 | 0.26 |
| *Post-trial* | | | | | | | |
| DM | 57.5 | 3.90 | 56.8 | 2.64 | 56.1 | 3.78 | 0.97 |
| ADF | ND | ND | ND | ND | ND | ND | ND |
| NDF | 43.9 | 5.42 | 42.6 | 4.11 | 40.8 | 6.61 | 0.94 |
| CP | 59.4 | 4.15 | 59.5 | 2.38 | 56.7 | 3.23 | 0.77 |
| Oil | 42.0 | 7.07 | 40.4 | 1.98 | 37.8 | 6.17 | 0.90 |
| Starch | 85.8 | 1.40 | 85.5 | 3.12 | 83.2 | 3.60 | 0.81 |

FIG. 3

ANIMAL FEED SUPPLEMENT

CROSS-REFERENCE TO RELATED APPLICATIONS

The present application claims the benefit under 35 U.S.C. § 119(e) of U.S. Provisional Application Ser. No. 61/789,094, filed Mar. 15, 2012, and titled "ANIMAL FEED SUPPLEMENT," which is herein incorporated by reference in its entirety.

BACKGROUND

The price of hay and feed concentrate have risen significantly over the past several years and based on the futures market and the reduction in hay acres, this trend appears to be staying. This increase in feed prices creates more of a financial burden on horse owners since a typical horse diet will contain hay and 3 to 10 pounds of grain depending on activity.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to an animal feed supplement that enhances digestibility and allows animals to be more efficient with rations. The supplement can include enzymes that decrease the amount of starch and fiber passing out of the small intestine and cecum.

DRAWINGS

FIG. 1 represents nutrient content of individual feed ingredients and total rations of horses fed a diet with no enzyme (CON), Enzyme Treatment 1 (TRT1), or Enzyme Treatment 2 (TRT2). The nutrient content is associated with the Example presented below in the Detailed Description.

FIG. 2 represents performance of horses fed a diet with CON, TRT1, or TRT2. The performance is associated with the Example presented below in the Detailed Description.

FIG. 3 represents nutrient percent digestibility of horses fed a diet with CON, TRT1, or TRT2 calculated by acid-insoluble ash. The nutrient percent digestibility is associated with the Example presented below in the Detailed Description.

Figure 6:
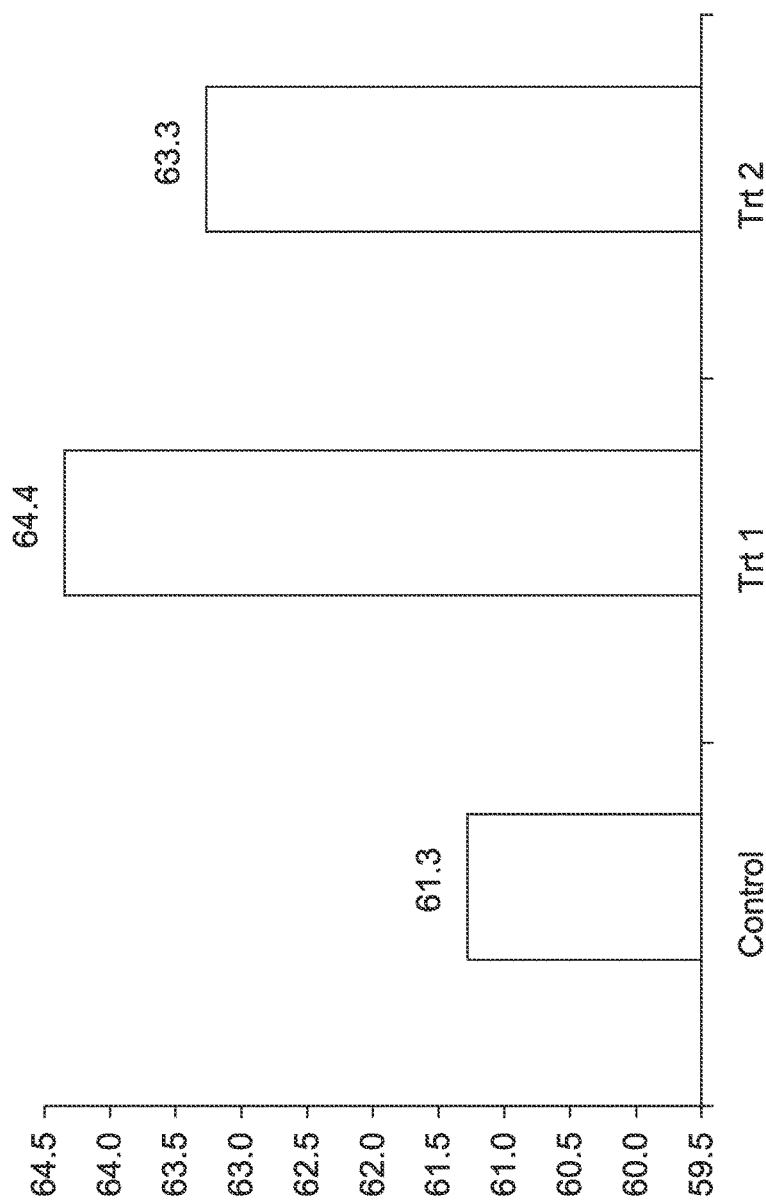

FIG. 6 is a graph of nutrient digestibility in horses fed a diet with CON, TRT1, or TRT2 calculated by acid-insoluble ash. The graph compares dry matter digestibility of diet versus CON, TRT1 or TRT2. The graph is associated with the Example presented below in the Detailed Description.

Figure 7:
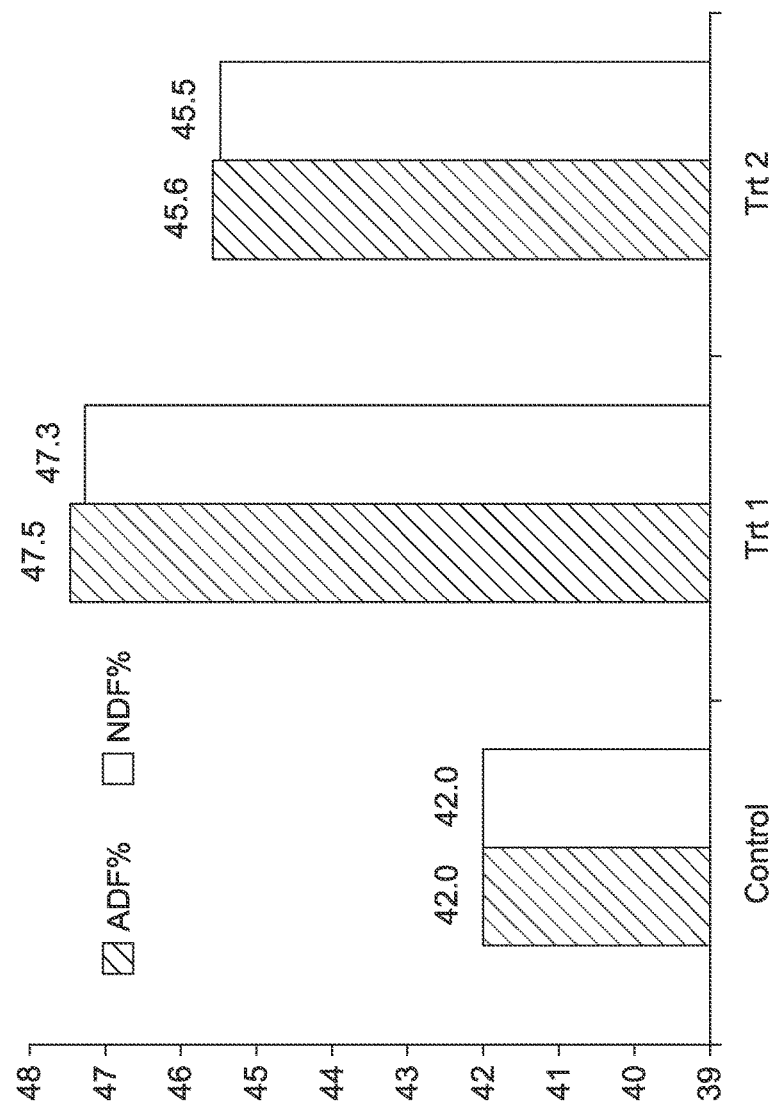

FIG. 7 is a graph of nutrient digestibility in horses fed a diet with CON, TRT1, or TRT2 calculated by acid-insoluble ash. The graph compares fiber (acid detergent and neutral detergent) versus CON, TRT1 or TRT2. The graph is associated with the Example presented below in the Detailed Description.

Figure 8:
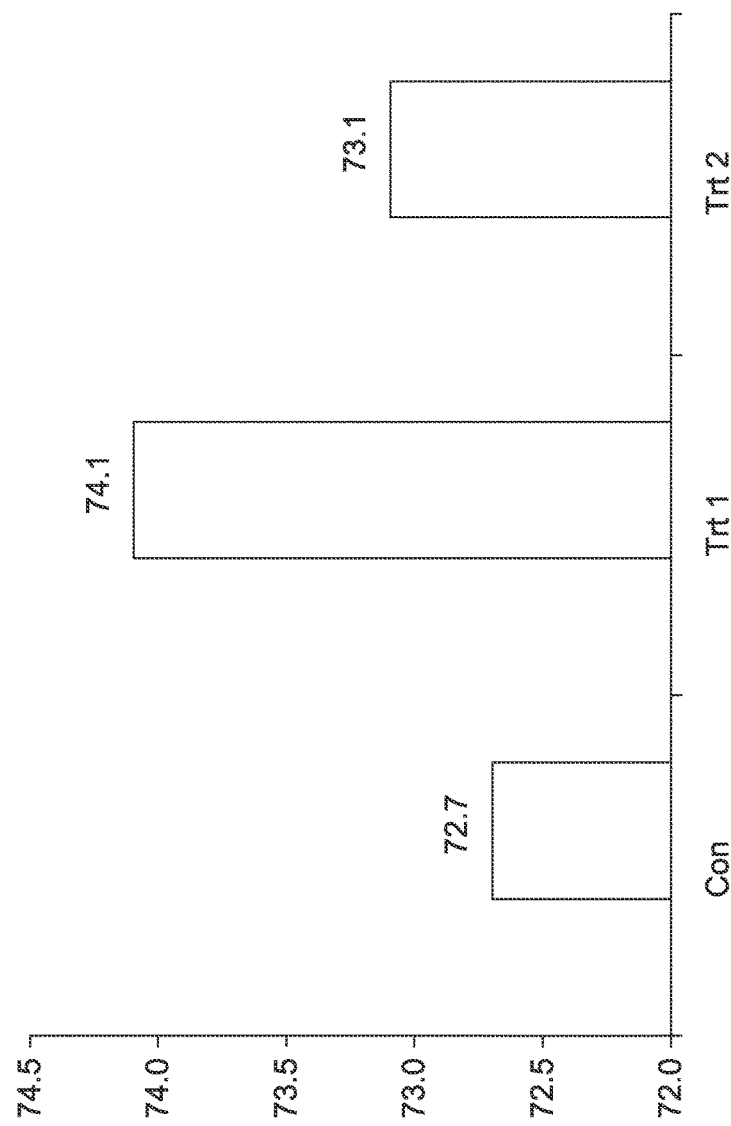

FIG. 8 is a graph of nutrient digestibility in horses fed a diet with CON, TRT1, or TRT2 calculated by acid-insoluble ash. The graph compares protein digestibility versus CON, TRT1 or TRT2. The graph is associated with the Example presented below in the Detailed Description.

Figure 9:
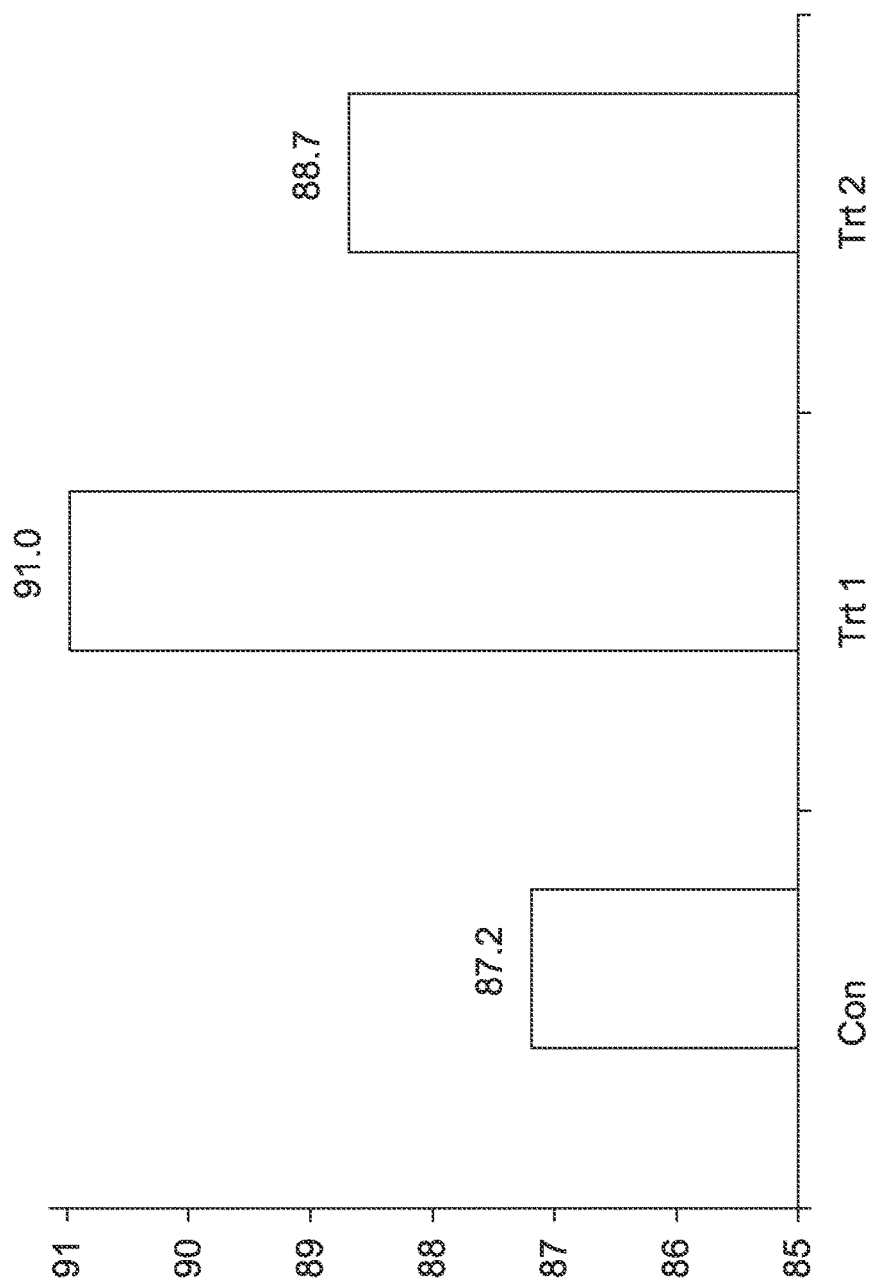

FIG. 9 is a graph of nutrient digestibility in horses fed a diet with CON, TRT1, or TRT2 calculated by acid-insoluble ash. The graph compares starch digestibility versus CON, TRT1 or TRT2. The graph is associated with the Example presented below in the Detailed Description.

Figure 10:
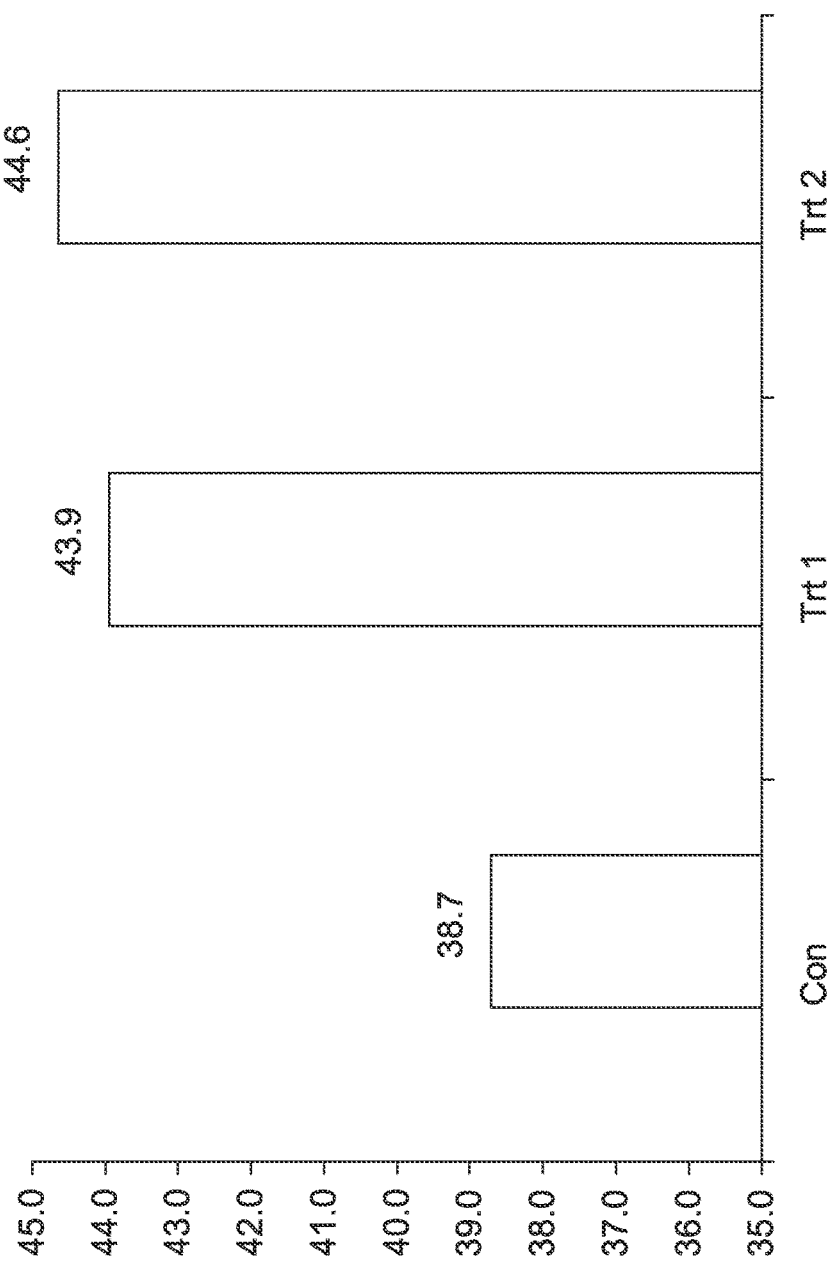

FIG. 10 is a graph of nutrient digestibility in horses fed a diet with CON, TRT1, or TRT2 calculated by acid-insoluble ash. The graph compares oil digestibility versus CON, TRT1 or TRT2. The graph is associated with the Example presented below in the Detailed Description.

Figure 11:
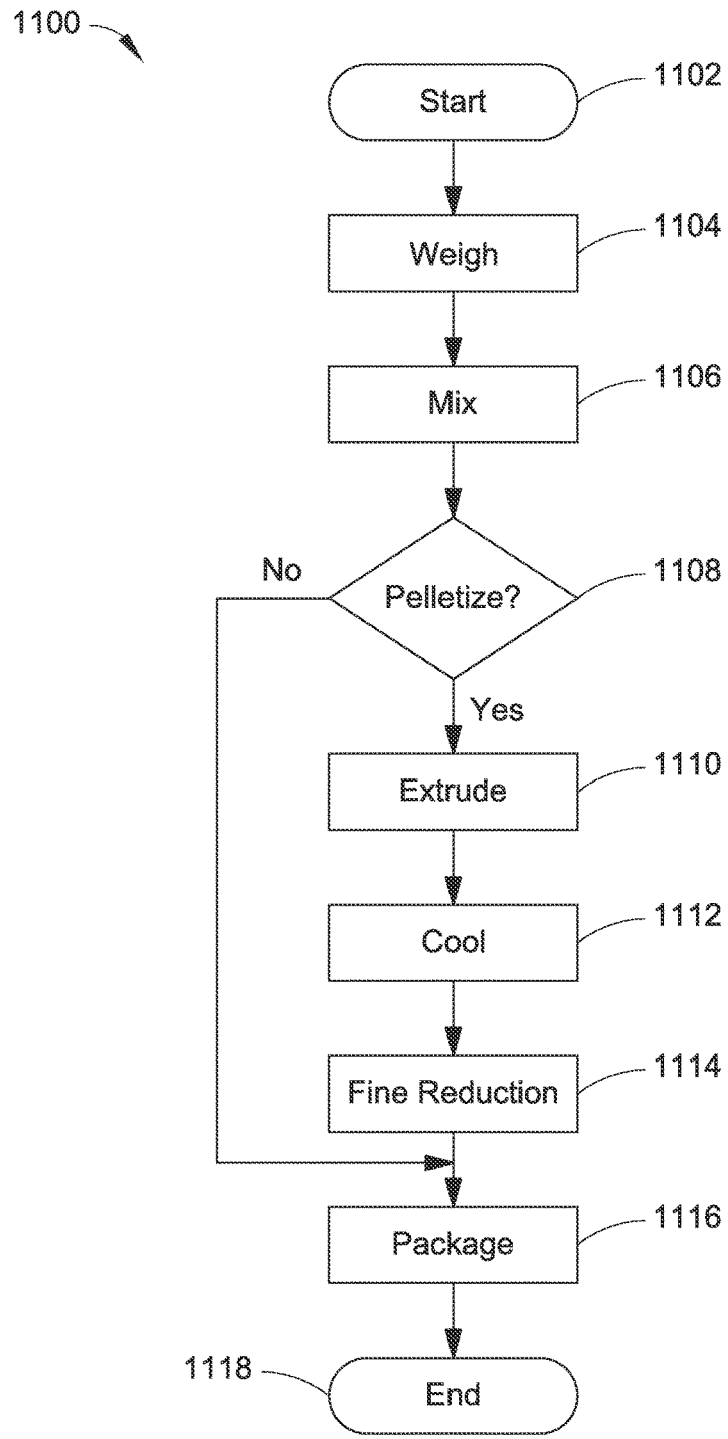

FIG. 11 is an example process flow diagram for manufacturing the feed supplement.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as methods, processes and/or formulations. The following detailed description is, therefore, not to be taken in a limiting sense.

Aspects of the disclosure relate to an animal feed supplement that enhances digestibility and allows animals to be more efficient with rations. The supplement can include enzymes that decrease the amount of starch and fiber passing out of the small intestine and cecum. In one aspect, the feed supplement is for a hoofed animal. In one aspect, the animal is an animal in the Equidae family. In another aspect, the animal is a horse, zebra or ass. Yet, the use of the feed and supplement should not be limited to such animals. For examples, the feed and supplement could have beneficial effects to ruminants and other animals as well.

A. FORMULATION

The feed supplement can include several ingredients. The feed supplement can be in a meal form or a pellet form. The supplement can include a fermentation premix. The fermentation premix can be about 25% to about 40% by total dry weight of the supplement. The fermentation premix can be about 25%, 26%, 27%, 28%, 29%, 30%, 31%, 32%, 33%, 34%, 35%, 36%, 37%, 38%, 39%, 40% to about 25%, 26%, 27%, 28%, 29%, 30%, 31%, 32%, 33%, 34%, 35%, 36%, 37%, 38%, 39%, 40% by total dry weight of the supplement. The fermentation premix can include a dried extracted glutamic acid fermentation composition and dried condensed corn fermentation soluble. The dried extracted glutamic acid fermentation composition can be about 30% to about 70% by total dry weight of the fermentation premix. For example, the dried extracted glutamic acid fermentation composition can be about 30%, 32%, 34%, 36%, 38%, 40%, 42%, 44%, 46%, 48%, 50%, 52%, 54%, 56%, 58%, 60%, 62%, 64%, 66%, 68%, 70% to about 30%, 32%, 34%, 36%, 38%, 40%, 42%, 44%, 46%, 48%, 50%, 52%, 54%, 56%, 58%, 60%, 62%, 64%, 66%, 68%, 70% by total dry weight of the fermentation premix. The dried condensed corn fermentation soluble can be about 30% to about 70% by total dry weight of the fermentation premix. For example, the dried condensed corn fermentation soluble can be about 30%, 32%, 34%, 36%, 38%, 40%, 42%, 44%, 46%, 48%, 50%, 52%, 54%, 56%, 58%, 60%, 62%, 64%, 66%, 68%, 70% to about 30%, 32%, 34%, 36%, 38%, 40%, 42%, 44%, 46%, 48%, 50%, 52%, 54%, 56%, 58%, 60%, 62%, 64%, 66%, 68%, 70% by total dry weight of the fermentation premix.

The supplement can include an encapsulated yeast and enzyme composition. The yeast can be encapsulated in a vegetable oil. In one aspect, the encapsulated yeast and enzyme composition can be utilized in situations when the supplement is pelletized. The encapsulation of the yeast in the vegetable oil insulates the yeast from the heat produced from the friction of pelletization. The insulation helps preserve the activity of yeast. The vegetable oil also helps minimize friction when the supplement is pelletized. As an example, the encapsulated yeast and enzyme composition can include *Kluyveromyces Marxianus* yeast culture, *Bacillus Subtilis* fermentation extract, *Trichoderma Longibrachiatum* fermentation extract, *Aspergillus Oryzae* fermentation extract, *Aspergillus Niger* fermentation extract, and vegetable oil. The encapsulated yeast and enzyme composition can be about 5.0% to about 15.0% by total dry weight of the supplement. For example the encapsulated yeast and enzyme composition can be about 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0% to about 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0% by total dry weight of the supplement.

In other aspects, the supplement can include an enzyme composition that is absent of the encapsulated yeast. For example, the enzyme composition can be utilized in situations when the supplement is maintained in a meal form. The enzyme composition can include *Bacillus Subtilis* fermentation extract, *Trichoderma Longibrachiatum* fermentation extract, *Aspergillus Oryzae* fermentation extract, and *Aspergillus Niger* fermentation extract. The enzyme composition can be about 5.0% to about 10.0% by total dry weight of the supplement. For example the enzyme composition can be about 5.0%, 5.5%, 6.0%, 6.5%, 7.0%, 7.5%, 8.0%, 8.5%, 9.0%, 9.5%, 10.0% to about 5.0%, 5.5%, 6.0%, 6.5%, 7.0%, 7.5%, 8.0%, 8.5%, 9.0%, 9.5%, 10.0% by total dry weight of the supplement.

The supplement can include an active dried yeast culture. As an example, the active dried yeast culture can be *Saccharomyces Cerevisiae* yeast dried in a manner to preserve the fermenting activity of the yeast. The active dried yeast culture can be about 25% to about 45% by dry weight of the supplement. For example, the active dried yeast culture can be about 25%, 30%, 35%, 40%, 45% to about 25%, 30%, 35%, 40%, 45% by total dry weight of the supplement.

The supplement can also include hydrolyzed yeast. The hydrolyzed yeast can be concentrated, non-extracted, and partially soluble. Solubilization can be accomplished by enzymatic hydrolysis of whole *Saccharomyces Cerevisiae* yeast cells. The hydrolyzed yeast can be about 5% to about 20% by dry weight of the supplement. For example, the hydrolyzed yeast can be about 5%, 6%, 7%, 8%, 9%, 10%, 11%, 12%, 13%, 14%, 15%, 16%, 17%, 18%, 19%, 20% to about 5%, 6%, 7%, 8%, 9%, 10%, 11%, 12%, 13%, 14%, 15%, 16%, 17%, 18%, 19%, 20% by total dry weight of the supplement.

The supplement can also include a yeast and beta glucan encapsulated fermentation composition. The yeast and beta glucan encapsulated fermentation composition can include *Saccharomyces cerevisiae* yeast culture, beta glucan encapsulated dried *Enterococcus Faecium* fermentation, beta glucan encapsulated dried *Lactobacillus Acidophilus* fermentation, beta glucan encapsulated dried *Aspergillus Niger* fermentation extract, beta glucan encapsulated dried *Trichoderma Longibrachiatum* fermentation extract, beta glucan encapsulated dried *Bacillus Subtilis* fermentation extract, and beta glucan encapsulated *Aspergillus Oryzae* fermentation extract. The yeast and beta glucan encapsulated fermentation composition can be about 1% to about 10% by total dry weight of the supplement. For example, the yeast and beta glucan encapsulated fermentation composition can be about 1%, 2%, 3%, 4%, 5%, 6%, 7%, 8%, 9%, 10% to about 1%, 2%, 3%, 4%, 5%, 6%, 7%, 8%, 9%, 10% by total dry weight of the supplement.

The supplement can also include an additional yeast additive. The additional yeast additive can be *Kluyveromyces Marxianus* yeast culture. The additional yeast additive can be about 0.25% to about 1.00% by total dry weight of the supplement. For example, the additional yeast additive can be about 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.00% to about 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.00% by total dry weight of the supplement.

The supplement can also include flavors such as fenugreek seed and/or dried molasses. Fenugreek seed flavoring can be about 0.1% to about 5% by total dry weight of the supplement. Molasses flavoring can be about 5.0% to about 20% by total dry weight of the supplement. The supplement can also include aromatics. For example, the aromatic can include anise. Such an aromatic can include from about 0.01% to about 1% by total dry weight of the supplement. In other aspects, the supplement can include a colorant such as a red iron oxide. The colorant can be included in about 1% to about 5% by total dry weight of the supplement. In still other aspects, the supplement can include a manure odor control agent. The manure control agent can include *Yucca Schidigera* Extract. The manure control agent can be included from about 0.1% to about 2.0% by total dry weight of the supplement. In still other aspects, when the supplement will be pelletized, the supplement can include a binder. For example, the binder can include a lignin and bentonite composition. The binder can be from about 1% to about 5% by total weight of the dry supplement.

An example formulation for the supplement processed in a meal form can be as indicated below in TABLE A:

TABLE A

| Ingredients | Range Total Dry Weight of Supplement | Another Range Total Dry Weight of Supplement | Another Range Total Dry Weight of Supplement |
|---|---|---|---|
| Fermentation Premix | about 25% to about 40% | about 25% to about 35% | about 27% to about 32% |
| Enzyme composition | about 5% to about 10% | about 6% to about 9% | about 7% to about 9% |
| Active dry yeast culture | about 25% to about 45% | about 35% to about 45% | about 36% to about 43% |
| Hydrolyzed | about 5% to | about 10% to | about 12% to |

TABLE A-continued

| Ingredients | Range Total Dry Weight of Supplement | Another Range Total Dry Weight of Supplement | Another Range Total Dry Weight of Supplement |
|---|---|---|---|
| yeast | about 20% | about 18% | about 26% |
| Yeast and beta glucan encapsulated fermentation | about 1% to about 10% | about 5% to about 9% | about 6% to about 8% |
| fenugreek seed | about 0.1% to about 5.0% | about 0.5% to about 1.0% | about 0.6% to about 0.7% |
| additional yeast additive | about 0.25% to about 1.00% | about 0.25% to about 0.75% | about 0.50% to about 0.75% |
| Anise aromatic | about .01% to about 1.0% | about .05% to about 0.5% | about .05% to about 0.2% |
| Manure control agent | about 0.1% to about 2.0% | about .05% to about 1.5% | about .05% to about 1.2% |

An example formulation for the supplement processed in a pelletized form can be as indicated below in TABLE B:

TABLE B

| Ingredients | Range Total Dry Weight of Supplement | Another Range Total Dry Weight of Supplement | Another Range Total Dry Weight of Supplement |
|---|---|---|---|
| Fermentation Premix | about 25% to about 40% | about 27% to about 38% | about 30% to about 36% |
| Coated Yeast & Enzyme composition | about 5% to about 15% | about 6% to about 12% | about 7% to about 10% |
| Active dry yeast culture | about 25% to about 45% | about 25% to about 35% | about 25% to about 32% |
| Hydrolyzed yeast | about 5% to about 20% | about 5% to about 15% | about 5% to about 10% |
| Yeast and beta glucan encapsulated fermentation | about 1% to about 10% | about 1% to about 5% | about 1% to about 3% |
| fenugreek seed | about 0.1% to about 5.0% | about 0.5% to about 1.0% | about 0.6% to about 1.0% |
| Anise aromatic | about .01% to about 1.0% | about .05% to about 0.5% | about .1% to about 0.2% |
| Dried Molasses | about 5.0% to about 20% | about 8.0% to about 18% | about 10.0% to about 17% |
| Red Iron Oxide | about 1% to about 5% | about 1% to about 4% | about 1% to about 3% |
| Binder | about 1% to about 5% | about 1% to about 4% | about 2% to about 3% |
| Manure control agent | about 0.1% to about 2.0% | about .05% to about 1.5% | about .05% to about 1.2% |

B. PROCESS

FIG. 11 is an example process 1100 for manufacturing the feed supplement. Process 1100 begins at start operation 1102 and continues to weigh operation 1104 where each of the ingredients is measured. The ingredients can be measured manually by weighing or quantifying. In other aspects, the ingredients are quantified via a computer system that measures an amount of a bulk ingredient and transports it into a mixing device.

From weigh operation 1104, process 1100 continues to mix operation 1106, where the ingredients are mixed. In one aspect, the ingredients can be mixed in a horizontal ribbon type mixer. Yet, any type of feed mixing apparatus is acceptable. The ingredients can be mixed until generally uniform and forming the feed supplement composition. For example, the ingredients can be mixed for 1-10 minutes.

From mix operation 1106, process 1100 continues to decision operation 1108 where the feed supplement can be pelletized. When the supplement is not to be pelletized, process 1100 continues from decision operation 1108 to packaging operation 1116 where the feed supplement can be packaged in a meal form. The feed supplement can be transported from the mix operation 1106 to the packaging operation 1116 by one or more conveyors (e.g. bucket conveying systems). When the supplement is to be pelletized, process 1100 continues from decision operation 1108 to extrude operation 1110. Yet, prior to extrude operation, the feed supplement can be transported via one or more conveyors into a holding vessel. The holding vessel can feed the feed supplement into an extruding device to form pellets. Just prior to extrusion, the feed supplement can have an ambient temperature. For example, the feed supplement can have a temperature of about 60° F. to about 110° F. The feed supplement can have a temperature of about 60° F., 65° F., 70° F., 75° F., 80° F., 85° F., 90° F., 95° F., 100° F., 105° F., 110° F. to about 60° F., 65° F., 70° F., 75° F., 80° F., 85° F., 90° F., 95° F., 100° F., 105° F., 110° F. The feed supplement can also have moisture content from about 5% to about 15%. As an example, the moisture content can be about 5%, 6%, 7%, 8%, 9%, 10%, 11%, 12%, 13%, 14%, 15% to about 5%, 6%, 7%, 8%, 9%, 10%, 11%, 12%, 13%, 14%, 15%. During extrusion, the pellet is subjected to friction which causes heating of the pellet. Yet, the friction can be managed via the oil component of the formulation. The heat caused by the extrusion causes the pellet to reach a temperature of less than 158° F. The pellet can reach a temperature from about 120° F. to about 160° F. For example, the temperature can be about 120° F., 122° F., 124° F., 126° F., 128° F., 130° F., 132° F., 134° F., 136° F., 138° F., 140° F., 142° F., 144° F., 146° F., 148° F., 150° F., 152° F., 154° F., 156° F., 158° F., 160° F. to about 120° F., 122° F., 124° F., 126° F., 128° F., 130° F., 132° F., 134° F., 136° F., 138° F., 140° F., 142° F., 144° F., 146° F., 148° F., 150° F., 152° F., 154° F., 156° F., 158° F., 160° F.

From extrude operation 1110, process 1100 continues to cool operation 1112 where the pellets are allowed to cool to near ambient temperatures. For example, the pellets could cool from about 10 to about 50 minutes to a temperature from about 60° F. to about 100° F.

After the pellets cool, process 1100 continues to fine reductions operation 1114. During fine reductions operation 1114, the pellets can be conveyed or moved over one or more sieves to remove fines. Also, the pellets can be subjected to an air wash to further remove any fines or dust particles. Process 1100 then continues to package operation 1116 where the pellets are packaged. Process 1100 then ends at operation 1118.

C. EXAMPLE

The objective of the below example is to evaluate the efficacy of the blend of the aforementioned feed supplements on improving nutrient digestibility and feed efficiency in mature horses. The example indicates that the addition of the feed supplement in equine diets improved the nutrient digestibility of those horses, which in turn improved the average daily gain in those animals, especially the horses fed Enzyme Treatment 1. This example demonstrates that this enzyme blend has potential to improve growth performance via improvements in nutrient digestibility and/or could be used to partially substitute energy sources in equine diets which are fed for maintenance.

1. Materials and Methods

Twelve horses (1125±32 lbs) were housed in a barn and fed alfalfa cubes ad libitum and 1.63 lbs of a supplement that was fed in the morning and containing 61% alfalfa meal, 24% placebo mix, and 15% Ytterbium (Yb) marker supplement for an eight-day adaptation period. At the end of the adaptation period, the horses were randomly assigned to diets containing ad libitum alfalfa cubes and 1.63 lbs of a supplement that was fed in the morning and containing 61% of a textured horse feed, 15% Yb marker, and 24% of a mix containing either: 1) Placebo (CON), 2) Enzyme treatment 1 (TRT1), or 3) Enzyme treatment 2 (TRT2). FIG. 1 represents nutrient content of individual feed ingredients and total rations of horses fed a diet with no enzyme (CON), Enzyme Treatment 1 (TRT1), or Enzyme Treatment 2 (TRT2).

The formulation of the placebo (CON) is indicated below in TABLE C:

TABLE C

| Ingredients | Range Total Dry Weight of Supplement |
|---|---|
| Soymeal | 49.08% |
| Dry Molasses | 20.25% |
| Calcium Carbonate | 15.60% |
| Rice Hulls | 14.05% |
| fenugreek seed | 0.63% |
| Vitamin B12 (600 mg/lb) | 0.28% |
| Anise aromatic | 0.13% |

The formulation of Enzyme treatment 1 (TRT1) is indicated below in TABLE D:

TABLE D

| Ingredients | Range Total Dry Weight of Supplement |
|---|---|
| Fermentation Premix | 32.50% |
| Coated Yeast & Enzyme composition[1] | 8.75% |
| Active dry yeast culture | 27.50% |
| Hydrolyzed yeast | 5.00% |
| Yeast and beta glucan encapsulated fermentation | 2.50% |
| fenugreek seed | 0.63% |
| Anise aromatic | 0.13% |
| Dried Molasses | 20.25% |
| Red Iron Oxide | 2.50% |
| Manure control | 0.25% |

[1]*Kluyveromyces Marxianus* yeast culture, *Bacillus Subtilis* fermentation extract, *Trichoderma Longibrachiatum* fermentation extract, *Aspergillus Oryzae* fermentation extract, and *Aspergillus Niger* fermentation extract.

The formulation of Enzyme treatment 2 (TRT2) is indicated below in TABLE E:

TABLE E

| Ingredients | Range Total Dry Weight of Supplement |
|---|---|
| Fermentation Premix | 32.50% |
| Enzyme composition[1] | 8.75% |
| Active dry yeast culture | 27.50% |
| Hydrolyzed yeast | 5.00% |
| Yeast and beta glucan encapsulated fermentation | 2.50% |

TABLE E-continued

| Ingredients | Range Total Dry Weight of Supplement |
|---|---|
| fenugreek seed | 0.63% |
| Anise aromatic | 0.13% |
| Dried Molasses | 20.25% |
| Red Iron Oxide | 2.50% |
| Manure control | 0.25% |

[1]*Bacillus Subtilis* fermentation extract, *Trichoderma Longibrachiatum* fermentation extract, *Aspergillus Oryzae* fermentation extract, and *Aspergillus Niger* fermentation extract.

Treatments were evaluated for 28 days and then all horses were fed CON for 14 days following the trial to evaluate any resulting carry-over effect. Horses were weighed at the start of the trial (−2 d) and at days 8, 13, 20, and 27 during the study and at day 41 after two weeks from the end of the trial. Daily intakes were measured and accompanying fecal samples were taken the following day prior to the morning feeding on three consecutive days at the end of the Acclimation Period (days −3, −2, −1) and periodically throughout the Main (enzyme) Trial: days 5-8, days 12-14, days 19-21, days 26-28; and days 38-40 (designated as Post-Trial, where enzyme treatments were removed from the diets). Samples of alfalfa cubes, textured supplement, alfalfa meal (Acclimation Period), Yb marker, and each treatment supplement were taken during each manure sampling period. Nutrient analysis of feeds and manure samples measured using AOAC approved procedures by Analab (Fulton, Ill.). Nutrient composition of the total ration was calculated based on the proportion of dry matter intake of each individual feed. Digestibility of nutrients was calculated via use of acid-insoluble ash as an internal marker.

Means of digestibility data during the Main (enzyme) Trial (days 1 to 28) were calculated by averaging the values obtained from each sampling period. Statistical analysis of nutrient digestibility and performance data were conducted using the MIXED procedure of SAS. Treatment was the fixed variable and the initial digestibility of the nutrient of interest during the acclimation period was used as a covariate for the statistical analysis of nutrient digestibility.

2. Results

Figure 4:
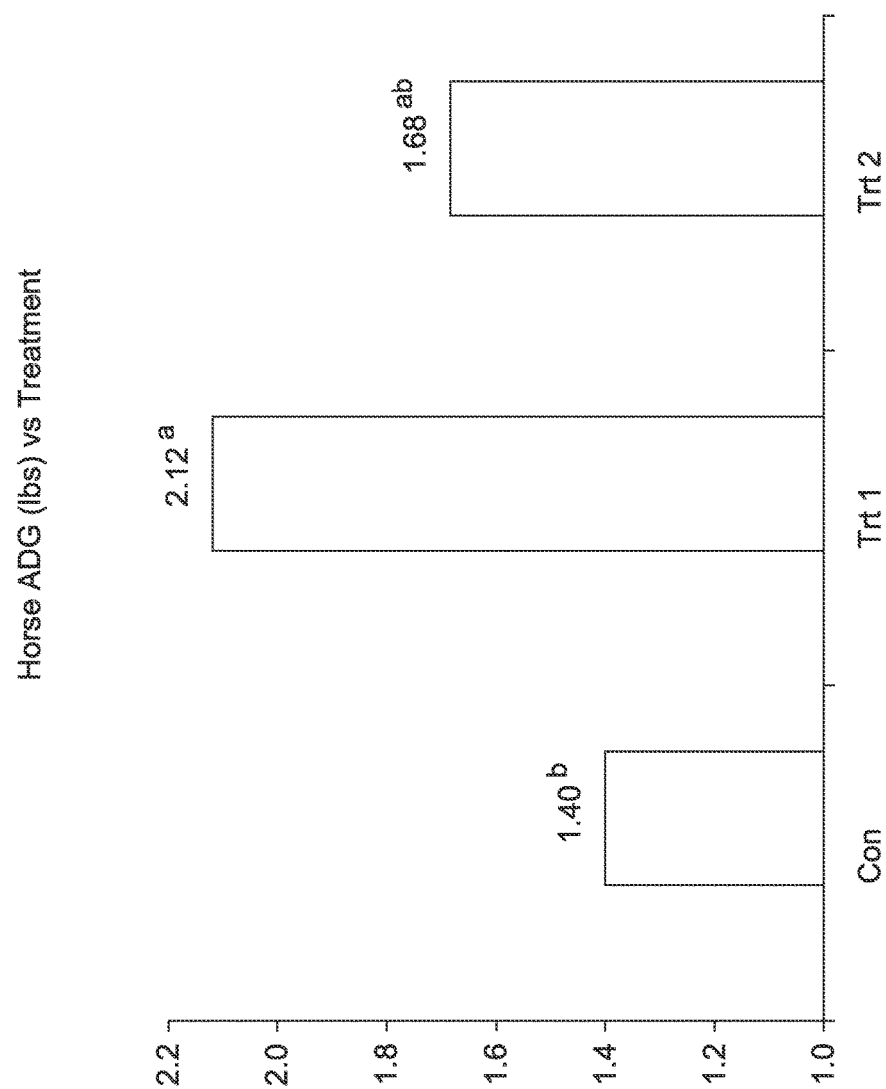
FIG. 4 is a graph of the average daily gain in pounds of a horse fed with CON, TRT1, or TRT2. The graph is associated with the Example presented below in the Detailed Description.
Figure 5:
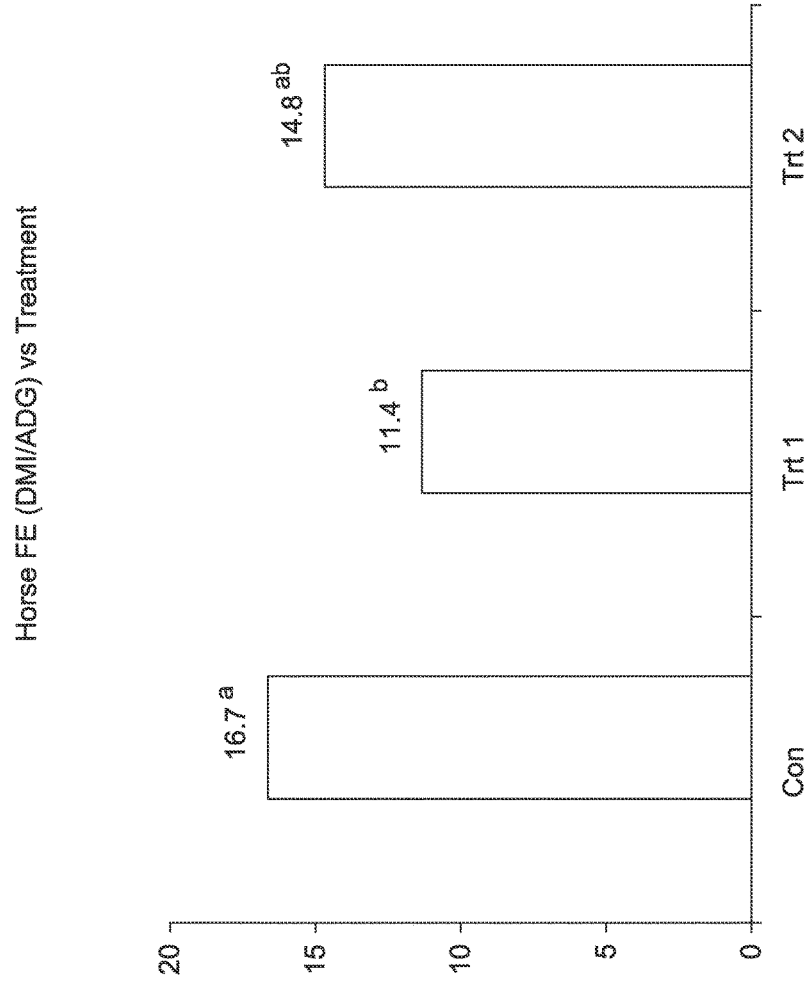
FIG. 5 is a graph of the feed efficiency (Dry Matter Intake/Daily Gain) of a horse fed with CON, TRT1, or TRT2. The graph is associated with the Example presented below in the Detailed Description.

FIG. 2 represents performance of horses fed a diet with CON, TRT1, or TRT2. FIG. 3 represents nutrient percent digestibility of horses fed a diet with CON, TRT1, or TRT2 calculated by acid-insoluble ash. FIG. 4 is a graph of the average daily gain in pounds of a horse fed with CON, TRT1, or TRT2. FIG. 5 is a graph of the feed efficiency (Dry Matter Intake/Daily Gain) of a horse fed with CON, TRT1, or TRT2. FIG. 6 is a graph of nutrient digestibility in horses fed a diet with CON, TRT1, or TRT2 calculated by acid-insoluble ash. The graph compares dry matter digestibility of diet versus CON, TRT1 or TRT2. FIG. 7 is a graph of nutrient digestibility in horses fed a diet with CON, TRT1, or TRT2 calculated by acid-insoluble ash. The graph compares fiber (acid detergent and neutral detergent) versus CON, TRT1 or TRT2. FIG. 8 is a graph of nutrient digestibility in horses fed a diet with CON, TRT1, or TRT2 calculated by acid-insoluble ash. The graph compares protein digestibility versus CON, TRT1 or TRT2. FIG. 9 is a graph of nutrient digestibility in horses fed a diet with CON, TRT1, or TRT2 calculated by acid-insoluble ash. The graph compares starch digestibility versus CON, TRT1 or TRT2. FIG. 10 is a graph of nutrient digestibility in horses fed a diet with CON, TRT1, or TRT2 calculated by acid-insoluble ash. The graph compares oil digestibility versus CON, TRT1 or TRT2.

As can be realized by FIGS. 1-10, the average daily gain of TRT2 was greater than CON during the enzyme trial and when the post-trial period was included in the analysis. The horses fed TRT1 had an intermediate response in average daily gain compared to CON and TRT2. Numerically, TRT2 had the greatest response with TRT1 being second compared to CON. Dry matter intake was similar for all animals throughout the study, but feed efficiency was significantly improved for TRT1 compared to CON due to the improved average daily gain. As observed with average daily gain, feed efficiency for TRT2 was not different compared to TRT1 and CON.

The nutrient digestibility as also calculated by acid-insoluble ash, as shown in FIG. 3. The numeric responses in nutrient digestibility were highly related to the responses observed in the growth data. All enzyme treatments had greater digestibility of DM, ADF, NDF, CP, oil, and starch compared to CON. TRT1 had the greatest of all treatments, except for oil. The improvement of digestibility explains why horses fed the enzyme treatments had greater daily gains compared to CON.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of manufacturing a feed supplement for an Equidae family animal, the method comprising:
receiving a feed supplement mixture, the feed supplement mixture maintained at about ambient temperature, wherein the feed supplement mixture includes:
fermentation premix from about 25% to about 40% by total dry weight of the feed supplement,
an encapsulated active yeast and enzyme composition including *Kluyveromyces marxianus* yeast encapsulated with an oil, the encapsulated yeast and enzyme composition being from about 5% to about 15% by total dry weight of the feed supplement,
an enzyme composition from about 5% to about 10% by total dry weight of the feed supplement,
an active dried yeast culture from about 25% to about 45% by total dry weight of the feed supplement, and
hydrolyzed yeast from about 5% to about 20% by total dry weight of the feed supplement; and
extruding the feed supplement mixture to pelletize the feed supplement mixture to a final extruded temperature from about 120° F. to about 160° F.

2. The method as recited in claim 1, further comprising mixing the fermentation premix, the yeast encapsulated with oil, the enzyme composition, the active dried yeast culture and the hydrolyzed yeast in a horizontal ribbon mixer to produce the feed supplement mixture.

3. The method as recited in claim 1, further comprising removing fines from the pelletized feed mixture.

4. The method as recited in claim 1, wherein the fermentation premix comprises a dried extracted glutamic acid fermentation composition from about 30% to about 70% by total dry weight of the fermentation premix.

5. The method as recited in claim 1, wherein the fermentation premix comprises dried condensed corn fermentation solubles from about 30% to about 70% by total dry weight of the fermentation premix.

6. The method as recited in claim 1, wherein the enzyme composition comprises one or more enzyme compositions cultured from at least one member of a group consisting: *Bacillus subtilis* fermentation, *Trichoderma longibrachiatum* fermentation, *Aspergillus oryzae* fermentation, and *Aspergillus niger* fermentation.

7. The method as recited in claim 1, wherein the active dried yeast culture comprises *Saccharomyces cerevisiae* yeast dried in a manner to preserve the fermenting activity of the yeast.

8. The method as recited in claim 1, wherein the hydrolyzed yeast comprises concentrated, non-extracted, and partially soluble *Saccharomyces cerevisiae* yeast cells.

9. The method as recited in claim 1, wherein the feed supplement mixture includes a yeast and beta glucan encapsulated fermentation composition from about 1% to about 10% by total dry weight of the feed supplement.

10. The method as recited in claim 9, wherein the yeast of the yeast and beta glucan encapsulated fermentation composition comprises *Saccharomyces cerevisiae*.

11. The method as recited in claim 9, wherein the beta glucan encapsulated fermentation composition comprises at least one member of a group consisting: beta glucan encapsulated dried *Enterococcus faecium* fermentation, beta glucan encapsulated dried *Lactobacillus acidophilus* fermentation, beta glucan encapsulated dried *Aspergillus niger* fermentation, beta glucan encapsulated dried *Trichoderma longibrachiatum* fermentation, beta glucan encapsulated dried *Bacillus subtilis* fermentation, and beta glucan encapsulated *Aspergillus oryzae* fermentation.

* * * * *